United States Patent [19]
Takahashi

[11] Patent Number: 5,986,999
[45] Date of Patent: Nov. 16, 1999

[54] TRACKING CONTROL DEVICE IN AN OPTICAL INFORMATION REPRODUCING DEVICE AND METHOD OF TRACKING CONTROL

[75] Inventor: Mario Takahashi, Kanagawa-ken, Japan

[73] Assignee: Kabushiki Kaisha Toshiba, Kawasaki, Japan

[21] Appl. No.: 08/839,979

[22] Filed: Apr. 24, 1997

[30] Foreign Application Priority Data

Apr. 25, 1996 [JP] Japan .................................... 8-105371

[51] Int. Cl.$^6$ ...................................................... G11B 7/00
[52] U.S. Cl. ...................... 369/124; 369/44.29; 369/44.41
[58] Field of Search ............................ 369/44.41, 44.42, 369/44.25, 44.26, 44.27, 44.34, 44.35, 44.36, 44.29, 54, 124

[56] References Cited

U.S. PATENT DOCUMENTS

| | | |
|---|---|---|
| 4,520,469 | 5/1985 | Todokoro et al. . |
| 4,785,441 | 11/1988 | Tanaka et al. ......................... 369/44.41 |
| 4,813,031 | 3/1989 | Bierhoff ................................ 369/44.41 |
| 4,998,235 | 3/1991 | Ishibashi et al. ..................... 369/44.41 |

FOREIGN PATENT DOCUMENTS

| | | |
|---|---|---|
| 52-93222 | 8/1977 | Japan . |
| 58-150144 | 9/1983 | Japan . |
| 6-325397 | 11/1994 | Japan . |

*Primary Examiner*—Thang V. Tran
*Attorney, Agent, or Firm*—Oblon, Spivak, McClelland, Maier & Neustadt, P.C.

[57] ABSTRACT

An optical information reproducing device and method of controlling the device capable of correcting a tracking remaining error component of a tracking error signal. The device includes a detector for detecting light of a laser beam reflected from a surface of an optical disk by a plurality of optical detectors and outputting a plurality of electric signals based on the detected reflected light, first delay circuits connected to the detector and capable of retarding one portion of the plurality of electric signals by a delay in a first predetermined range, and second delay circuits connected to the detector and capable of retarding another portion of the plurality of electric signals by a delay within a second predetermined range. Adding circuits are respectively connected to the first and the second delay circuits for forming a first and a second added signal by adding output signals from the first and the second delay circuits, and a phase detecting circuit is connected to the adding circuits for detecting a phase difference between the first and the second added signals. The tracking remaining error can be determined from the output of the phase detecting circuit and canceled or compensated to allow accurate tracking.

38 Claims, 10 Drawing Sheets

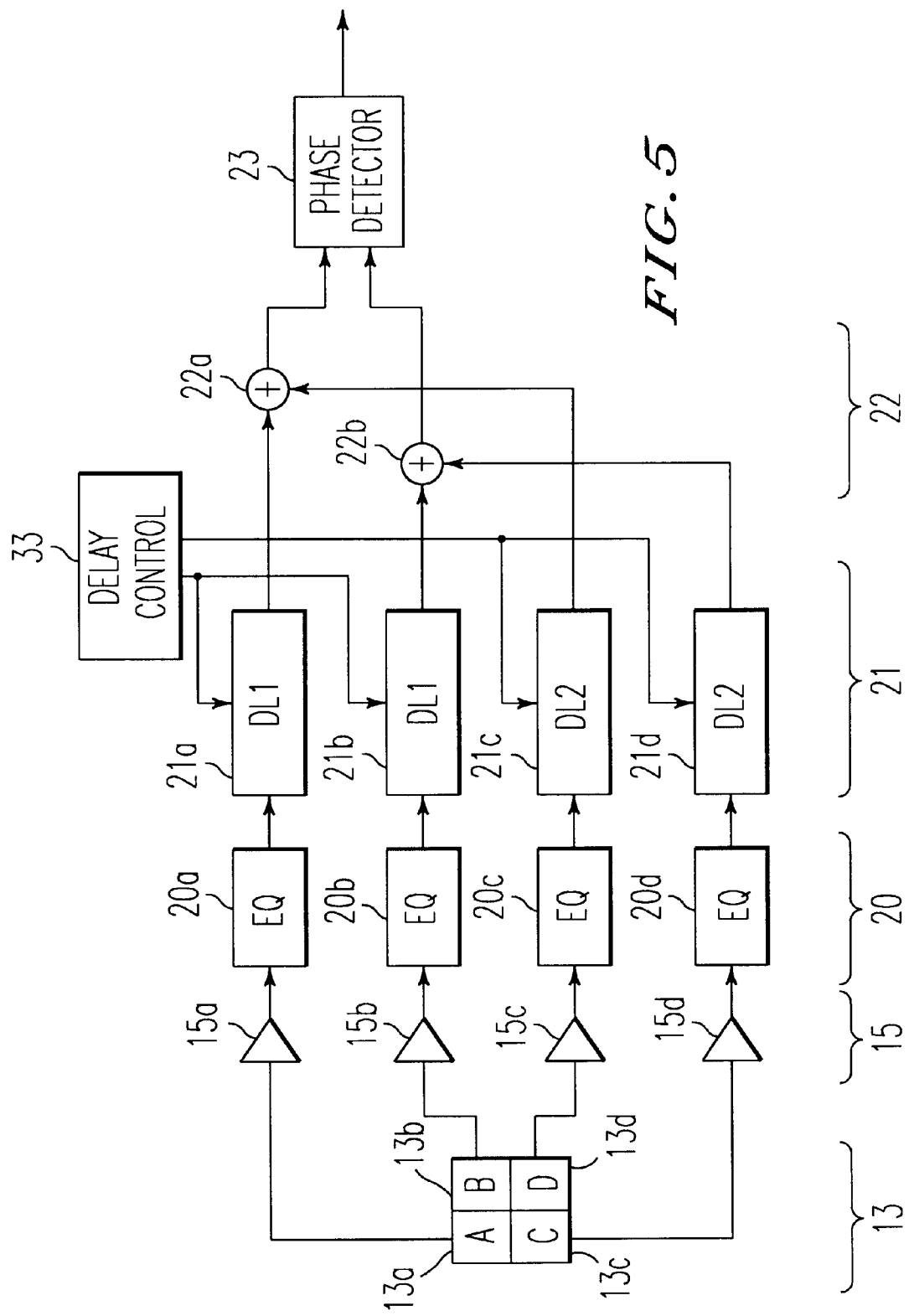

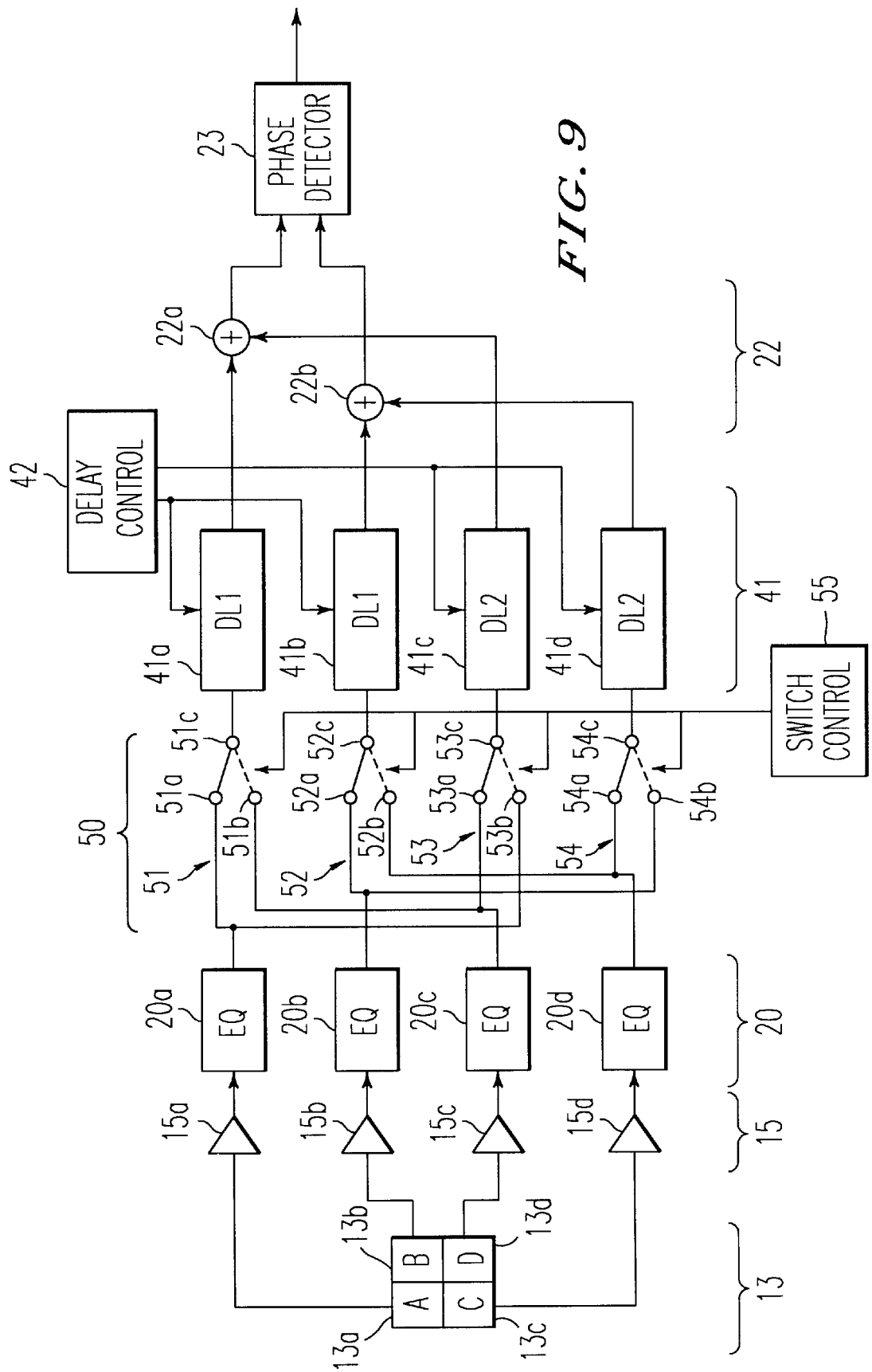

TRACKING CONTROL DEVICE IN AN OPTICAL INFORMATION REPRODUCING DEVICE AND METHOD OF TRACKING CONTROL

BACKGROUND OF THE INVENTION

1. Field of the Invention

The present invention relates to an optical information reproducing device and a method of controlling thereof, particularly to a tracking control device of a light receiving element of an optical information reproducing device for reproducing information recorded in an optical disk such as a CD (Compact Disk), a DVD (Digital Video Disk) or the like and a method of controlling thereof.

2. Description of the Background Art

In reproducing information recorded on an optical disk such as a CD or a DVD or the like, a laser beam having a predetermined wavelength is irradiated on a track (pit) recorded on the optical disk and light of the laser beam reflected from the track is detected by a pickup (light receiving element) whereby reproducing signals are formed.

The pickup includes a photoelectric conversion element which converts detected light from the optical disk into electric signals and outputs them. The photoelectric conversion element is normally constituted by four photodiodes, and the light reflected from the track is detected by each of the four photodiodes and electric signals are outputted on four signal paths as output signals from the same track.

Meanwhile, it is especially important in the optical information reproducing device that the reflected light from pit rows on the track recorded on the optical disk is detected with no deviation. That is, the track is inscribed on the optical disk at a high density and a very small width and accordingly, fine control of the pickup is necessary such that the pickup accurately detects light reflected from the track. In the following explanation control of the pickup is referred to as tracking control.

For tracking control, a method of using an auxiliary pickup for detecting exclusively only data for tracking in addition to a pick up for detecting data for information and a method of using the same pickup for detecting both data for information and data for tracking are known. There has been a method according to the latter system in which respective electric signals from two of the four signal paths, from a photoelectric conversion element included in a pickup, are added to give a phase difference between the two electric signals which is fed back to an actuator motor for controlling the pickup by which the position of the pickup is controlled. Such a method of tracking control is the most generally-used conventional method and also the device is generally known.

According to the above method, the tracking error value can be detected as a voltage level by calculating the difference between the output signal values of each pickup. Then, the tracking error value can be detected without the influence of electrical noise, or the intensity of the light reflected from the track surface.

However, according to the method where the same pickup is used for detecting both data corresponding to information and tracking data, when the optical disk is searched, that is, when the lens and pickup are shifted in the radial direction of the optical disk, a direct current offset voltage is generated between the two signals used to calculate the phase difference. That is, a physical shift is caused between the lens and pickup. Due to this physical shift, a electrical shift based on the phase difference and electrical intensity is caused between the two routes of electric signals. This electrical shift is equal to a direct current offset voltage and it is inherent in each disk depending on the depth and shapes of the pit. The offset voltage is referred to as tracking remaining error value in the following description. It should be noted that the tracking remaining error is different from the tracking error caused by deviation of the pickup from the track or the like.

The tracking remaining error is described in Japanese Patent Laid Open (Kokai) 6-325397. The tracking error signal comprises a real tracking error component (i.e., the tracking error) and a quasi-tracking error component (i.e., the tracking remaining error). In FIGS. 5 and 6 of this application, reproduced here as FIGS. 12A and 12B, the amplitude of the real tracking error component is S (S1 or S2), and the amplitude of the quasi-tracking error component is N (N1 or N2) of respective pit depths of 60 nm and 110 nm. The real component represents a relative position of a laser beam spot to the track which is a series of pits (or projections) formed on a disc. The quasi-tracking error component is caused by movement of an object lens and does not represent this relative position.

When the tracking remaining error is present, and when servo-control of tracking is conducted for a target track after finishing the search, a physical shift is caused between, for example, a target track on the disk and a target of a laser spot and fine tracking control cannot be executed. This situation originates since the circuit for detecting the tracking error cannot distinguish between the error in the input signals of the tracking error and the tracking remaining error. Accordingly, it is necessary to electrically correct the offset voltage, that is, the tracking remaining error, when the optical disk is first loaded in a reproducing device. This allows tracking control to be executed without regard to the physical shift caused between the lens and pickup.

A system of correcting the tracking remaining error has been developed, as a technology developed for reproducing CDs, in which a portion of an output signal from a photoelectric conversion element is retarded by phase-shifting. FIG. 1 is a diagram of a device used in this system. According to this device, two of four signal paths for the output signals from a photoelectric conversion elements 13a–13d, are respectively connected to delay circuits 21a and 21b where the delay (delay time) is variable. The delays of the delay circuits 21a and 21b are set by a delay control unit 31 in accordance with the detected tracking remaining error and the delays are added to the output signals from the photoelectric conversion element 13 by which the tracking remaining error is corrected. Also in FIG. 1, reference numerals 15a, 15b, 15c and 15d designate pre-amplifiers, reference numerals 20a, 20b, 20c and 20d designate equalizers for shaping the waveforms of the output signals from the photoelectric conversion element and reference numeral 23 designates a phase detector for comparing the phases of signals produced by addition using adders 22a and 22b. Further, the tracking remaining error is corrected by the following procedure before reproducing data of a disk whenever the disk is loaded.

(1) Predetermined delays are set to the delay circuits, the lens is radially shifted and the amount of the tracking remaining error is detected.

(2) The optimum delays are set in accordance with the detected amount.

(3) The optimum delays are set to the delay circuits, the lens is radially shifted and the amount of the tracking remaining error is detected.

(4) The above operation is finished when the tracking remaining error is within a predetermined range. The above operation is repeated when the tracking remaining error is outside of the predetermined range.

Further, in procedure (1), the tracking remaining error is detected by, at first, moving the object lens of pickup by a constant amount in the radial direction of the optical disk, for example, toward the outer edge. From a maximum value and a minimum value of the error amount of the tracking remaining error provided by the movement, a first median value is calculated. Next, the object lens is moved toward the inner edge, and a second median value is calculated in the same manner. Finally, a difference between the first and second median values is calculated, and then, the tracking remaining error is detected.

In procedure (4), the predetermined range is set such that there is no influence by the tracking remaining error on tracking control.

The specification of the pit depth (pit height or projected value of pit) of a CD is for each disk in a range of $\lambda/8n$ through $\lambda/6n$, where $\lambda$ is wavelength of laser beam and n is the refractive index of a disk. Accordingly, the tracking remaining error has a value within the range of the projected value of pit. Further, the tracking remaining error and the corrective delay have a single monotonic relationship when the pit depth of CD is less than $\lambda/4n$ (see FIG. 2).

In the case of the above-described conventional system, it is sufficient that the delay circuits correct the tracking remaining error for each disk within the range of the projected value ($\lambda/8n$ through $\lambda/6n$). That is, as shown by a relation between the pit depth and the offset voltage, the tracking remaining error in the conventional reproducing device of CDs may be corrected only using the single relationship and within a narrow range corresponding to $\lambda/8n$ through $\lambda/6n$.

However, the development of an optical disk having ultra high density capable of recording and reproducing compressed image code, voice code, etc., has been rapidly progressing in recent years. The specifications with respect to methods of storing data on an optical disk in the case of DVDs is broader than that of CDs. Each disk is manufactured with the pit depth centering on $\lambda/4n$ and having ranges deeper and shallower than $\lambda/4n$, and the tracking remaining error of the pit depth for each disk occurs in both the positive direction and the negative direction with respect to the center of the pit depth of $\lambda/4n$. Further, in the case of the specifications of a two-layer structure manufactured by bonding together two sheets of disks, the shapes of pits viewed from one direction include both projections and recesses. The positive or negative direction of the racking remaining error is reversed in accordance with projections or recesses of pits, that is, an upper layer or a lower layer of the bonded layer.

When delay circuits similar to those in CDs are realized using APFs (All Pass Filters) to be able to comply with the DVD specifications, the following problems are caused. FIGS. 3A and 3B illustrate the electric properties of a general APF. FIG. 3A shows the relation between the frequency and delay of a signal provided by an APF and FIG. 3B shows the relation between the delay and the gain of the APF. The broken line in FIG. 3A indicates the case where the delay is large and the solid line indicates the case where the delay is small. The broken line in FIG. 3B indicates the case where the cut-off frequency of the APF is high and the solid line indicates the case where the cut-off frequency is low. As illustrated, the cut-of frequency fmax of the APF is lowered in the case where the delay of the delay circuit is set large compared with the case where it is set small. The maximum delay Dmax is lowered in the case where the cut-off frequency is set high compared with the case where it is set low.

Accordingly, when the delay circuit is realized with an APF in the case of CDs, the gain of a reproducing signal of a pit having the narrowest pit width 3T (where T is the clock period) and having a high frequency of occurrence, may be reduced in DVDs, or the delay may deviate from a constant range. As a result, it becomes difficult to accurately conduct tracking control or accurately provide the reproduced signals. Further, when a delay circuit having a time constant without deterioration of its frequency characteristic is to be manufactured, the circuit will become larger or the manufacturing cost will be increased.

SUMMARY OF THE INVENTION

It is an object of the present invention to solve the above-described problems.

Another object of the present invention is to provide an optical information reproducing device and a method of controlling thereof capable of correcting the tracking remaining error in a wide range of delay time.

A further object of the present invention is to facilitate the design of a delay circuit without increasing the size of the circuit or increasing its manufacturing cost.

These and other objects are achieved by an optical information reproducing device having an optical detector, and first and second delay circuits connected to the detector. The first and second delay circuits have delays which are different from each other. The delays in the first and second circuits may also be adjustable and reversely related to each other. By adjusting the delays, a tracking remaining error can be canceled or compensated allowing accurate tracking.

The device may also include adding circuits connected to the delay circuits which add selected signals together. The added signals are input to a phase detector which detects a phase difference between the two signals. The tracking remaining error is related to this phase difference. By adjusting the delays, the phase difference can be adjusted, thus canceling or compensating the tracking remaining error.

An delay controller which controls the delays in the delay circuits may be used. The delay controller, receives information concerning the phase difference and outputs a control signal to appropriately adjust the delays in the delay circuit. The delay controller can use predetermined delay/control parameter relationships to adjust the delays. The relationships for the two delay circuits may be reversely related.

These and other objects are also achieved by an optical information reproducing device including detecting means for detecting light of a laser beam reflected from a surface of an optical disk using a plurality of optical detectors and outputting a plurality of electric signals based on the detected reflected light, first delay circuits connected to the detecting means capable of delaying one portion of the plurality of electric signals by a first delay within a first predetermined range, second delay circuits connected to the detecting means capable of delaying other portion of the plurality of electric signals by a second delay, adding circuits connected respectively to the first and the second delay circuits for adding output signals from the first and the second delay circuits and forming first and second added signals, phase detecting means connected to the adding circuits for detecting a phase difference between the first and the second added signals, and a delay control unit for setting the delays of the first and the second delay circuits based on an output signal from the phase detecting means such that the phase difference between the first and the second added signals falls in a predetermined range.

There may be included in the optical information reproducing device a switching means provided between the detecting means and the first and the second delay circuits for switching connections between the optical detectors and the first and the second delay circuits, and the delays in the first and the second predetermined ranges of the first and the second delay circuits may fall in a same range. Further, medians of the delays in the first and the second predetermined ranges of the first and the second delay circuits may coincide with each other.

According to another feature of the invention, assuming a wavelength of the laser beam as $\lambda$, the delay where the delays in the first and the second predetermined ranges of the first and the second delay circuits coincide with each other corresponds to the depth of a pit of substantially $\lambda/4n$.

According to another aspect of the present invention, there is provided an optical information reproducing device, wherein the optical detector comprises four photodiodes arranged in a matrix and the first and the second delay circuits retard the electric signals each corresponding to two of the diagonally arranged photodiodes respectively by a same delay.

According to another aspect of the present invention, there is provided a method of controlling an optical information reproducing device including a first step of calculating a first error amount of a tracking remaining error by performing tracking control in an OFF state, irradiating a laser beam on a surface of a optical disk and moving by a first constant amount a plurality of optical detectors for detecting a light reflected from the optical disk in a radial direction of the optical disk, a second step of calculating a second error amount of the tracking remaining error by moving by a second constant amount the plurality of optical detectors in an opposite radial direction of the optical disk, a third step of calculating a difference between the first and the second error amounts and determining whether the difference falls in a predetermined range, a fourth step of setting the delays of respective delay circuits for respectively retarding output signals from the plurality of optical detectors in accordance with an absolute value and a positiveness or a negativeness of the calculated difference when the difference is determined to be out of the predetermined range, and a fifth step of executing the first, the second and the third step based on the set delay.

According to another aspect of the present invention, there is provided a method of controlling an optical information reproducing device including a first step of calculating a first error amount of a tracking remaining error by performing tracking control in an OFF state, irradiating a laser beam on a surface of an optical disk and moving by a first constant amount a plurality of optical detectors for detecting light reflected from the optical disk in a radial direction of the optical disk, a second step of calculating a second error amount of the tracking remaining error by moving by a second constant amount the plurality of optical detectors in an opposite radial direction of he optical disk, a third step of calculating a difference between the first and the second error amounts and determining whether the difference falls in a predetermined range, a fourth step of setting delays of respective delay circuits for respectively retarding output signals from the plurality of optical detectors in accordance with the calculated difference when the difference is determined to be outside of a predetermined range, and a fifth step of executing the first, the second and the third steps based on the set delays and setting delays having absolute values the same as absolute values of the delays in reverse directions to the respective delay circuits when the difference calculated in the third step increases.

According to another aspect of the present invention, there is provided the method of controlling an optical information reproducing device, wherein the first error amount is a median value of a maximum value and a minimum value of an error amount provided in moving the plurality of optical detectors by the first constant amount in the radial direction of the optical disk.

According to another aspect of the present invention, there is provided the method of controlling an optical information reproducing device, wherein the second error amount is a median value of a maximum value and a minimum value of an error amount provided in moving the plurality of optical detectors by the second constant amount in the opposite radial direction of the optical disk.

According to another aspect of the present invention, there is provided the method of controlling an optical information reproducing device, wherein the fourth step or the fourth and the fifth steps are not carried out or the method is finished at the third step when the difference falls in the predetermined range.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a block diagram showing a portion of a tracking control circuit according to a first embodiment of the present invention;

FIG. 9 is a block diagram showing a portion of a tracking control circuit according to a second embodiment of the present invention;

DESCRIPTION OF THE PREFERRED EMBODIMENTS

Figure 4:
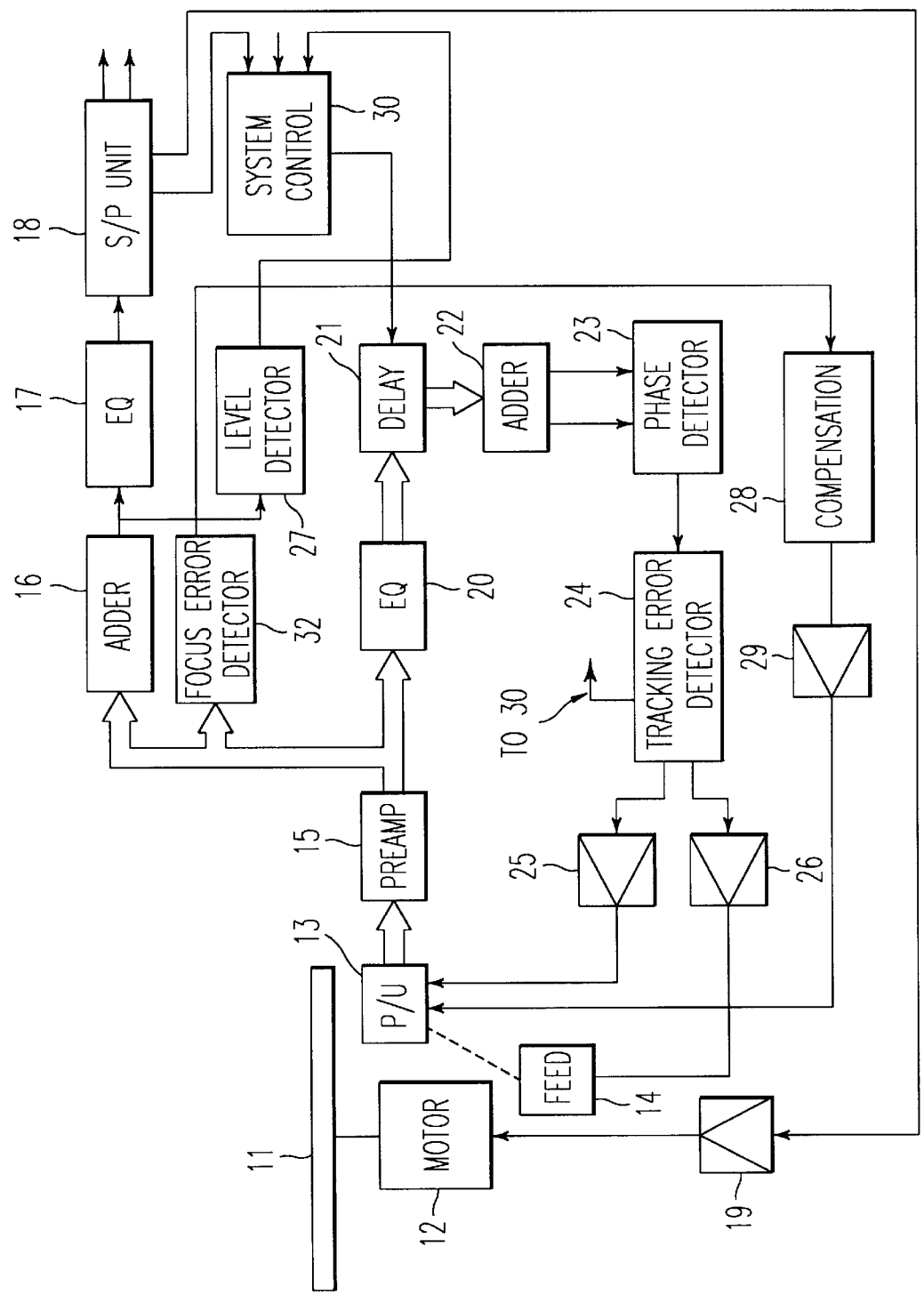
FIG. 4 is a block diagram of an optical information reproducing device according to the present invention.

Referring now to the drawings, where like reference numerals designate corresponding parts throughout the views, and more particularly to FIG. 4, which illustrates an optical information reproducing device according to a first embodiment of the present invention. But first, the device according to the invention will be explained in general to facilitate a better understanding of the technology to which the invention is applied.

An optical disk 11 is, for example, either a DVD-ROM (Read Only Memory), a DVD-RAM (Random Access Memory), a CD and the like. The optical disk 11 is rotated by a disk motor 12. A pickup 13 is arranged opposing optical disk 11 and is moved in a radial direction of optical disk 11. Pickup 13 comprises an optical system including, for example, a light emitting element, an optical conversion element divided into four, for example, photodiodes, an object lens, a tracking control mechanism, a focusing control mechanism and the like (not illustrated). Further, in the case of a device capable of handling both DVD and CD optical disks, the device can be designed to switch between a beam for DVD and a beam for CD.

A laser beam emitted from the light emitting element included in the pickup 13 is irradiated on the optical disk 11 and is reflected in accordance with pits on the track of the optical disk 11. The reflected light is received, photoelectrically converted by respective photodiodes, and outputted as electric signals. The output signals from the respective photodiodes, that is, the electric signals from the pickup 13, are supplied to a pre-amplifier 15. The pre-amplifier 15 amplifies the electric signals from the pickup 13 and outputs them to an adder 16. The adder 16 synthesizes the output signals from the pre-amplifier 15. The synthesized signals (RF signals) outputted from the adder 16 are supplied to a signal processing unit 18 via an equalizer 17 where waveforms are shaped. The signal processing unit 18 detects the frequency and the phase of a reproduced signal and decodes a control signal included in the reproduced signal. Further, the signal processing unit 18 forms a motor control signal controlling the disk motor 12 using the decoded control signal and the motor control signal is supplied to the disk motor 12 via a drive circuit 19.

Also, the output signals from the pre-amplifier 15 are supplied also to a delay circuit 21 via an equalizer 20. The delay circuit 21 is provided for correcting the tracking remaining error and the details thereof are described below. The output signals from the delay circuit 21 are supplied to an adder 22. The adder 22 adds two pairs of the output signals of two of the four paths of the electric signals outputted from the divided photodiodes. The output signals from the adder 22 are supplied to a phase detector 23 which detects the phase difference between the two input signals and outputs a signal in accordance with the phase difference. This signal is supplied to a tracking error detector 24 which forms a tracking error signal, and a signal fed back to controller 30. The tracking error signal is supplied to a tracking control mechanism, not illustrated, included in the pickup 13 via a drive circuit 25 and the position of the pickup 13 is controlled by starting the tracking control mechanism by which tracking control is carried out. Further, when amount of control indicated by the tracking error signal outputted from the tracking error detector 24 is large, the tracking error signal is supplied to a feed motor 14 via a drive circuit 26 by which pickup 13 is moved.

Furthermore, the output signal from pre-amplifier 15 is supplied to the focus error detector 32 and utilized as a focusing error signal. The output signal of the focus error detector 32 is supplied to a compensation amplifier 28. The focusing control signal outputted from the compensation amplifier 28 is supplied to a focusing control mechanism of the pickup 13 via a drive circuit 29. The level detector 27 detects the level of the focusing error signal and supplies the detected output signal to a system control unit 30.

The system control unit 30 controls the operation of the device and determines the kind of the optical disk 11 in accordance with the detected output signal outputted from the level detector 27. Information read from the optical disk is reproduced by using the result of the determination. Also, the system control unit 30 sets the delay of the delay circuit 21 based on the signal supplied from the tracking error detecting circuit 24.

Next, a more detailed explanation will be given of the first embodiment with reference to FIG. 5. The circuit of FIG. 5 corresponds to a portion of FIG. 4. The light detector (photoelectric conversion element) installed in the pickup 13 is constituted by four photodiodes 13a through 13d. The output signals from the photodiodes 13a through 13d are respectively supplied to equalizers (EQ) 20a through 20d where waveforms are shaped, via pre-amplifiers 15a through 15d. Although four equalizers and pre-amplifiers are shown, other arrangements are possible. The output signals from the equalizers 20a and 20b are respectively supplied to first delay circuits (DL1) 21a and 21b and the output signals from the equalizers 20c and 20d are respectively supplied to second delay circuits (DL2) 21c and 21d. The first and the second delay circuits 21a through 21d are constituted by, for example, APFs and their delays are controlled in accordance with control voltages outputted from a delay control unit 33 that set the relationship of adjusting the delay time to be reversely related. The circuit constructions of the first delay circuit and the second delay circuit may be the same.

Delay control unit 33 is included in a system control unit 30 and has data for defining the delays and the delay relationships of the delay circuits 21a through 21d corresponding to the output signals supplied to the system control unit 30 from tracking error detector 24. Then, the delay control unit 33 outputs control voltage in accordance with the data for controlling the delays and the delay relationships to delay circuits 21a through 21d, as described in more detail below in connection with FIG. 5.

An output signal from the first delay circuit 21a and an output signal from the second delay circuit 21c are added by a first adder 22a and an output signal from the first delay circuit 21b and an output signal from the second delay circuit 21d are added by a second adder 22b. Accordingly, first and the second adders 22a and 22b add the signals outputted from the diagonally-disposed two photodiodes among the divided photodiodes. The output signals from the first and second adders 22a and 22b are respectively supplied to the phase detector 23. The phase detector 23 detects a phase difference of the input signals. This difference is detected by circuit 24

Figure 6A:
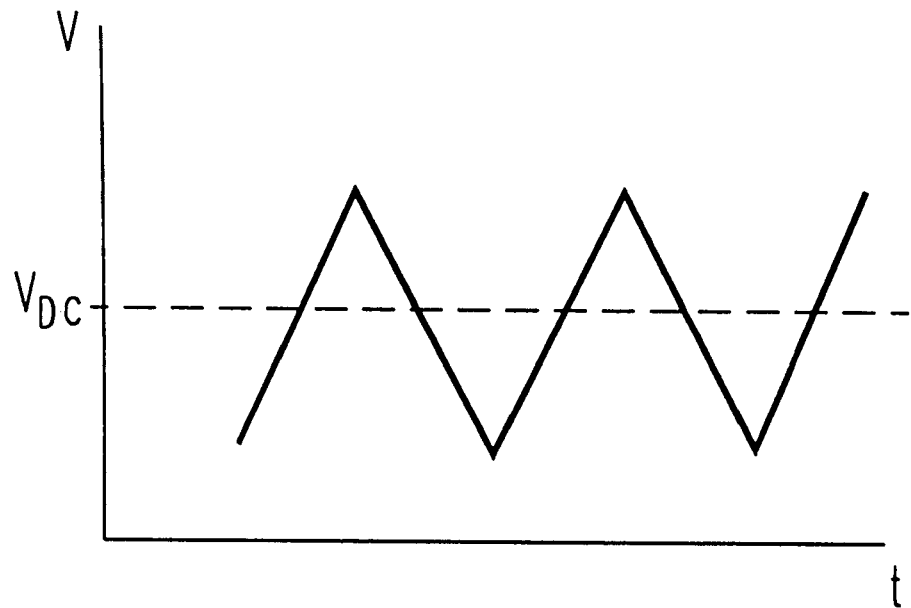
FIGS. 6A and 6B are waveforms output by the phase detector in the tracking control circuit of FIG. 5.
Figure 6B:
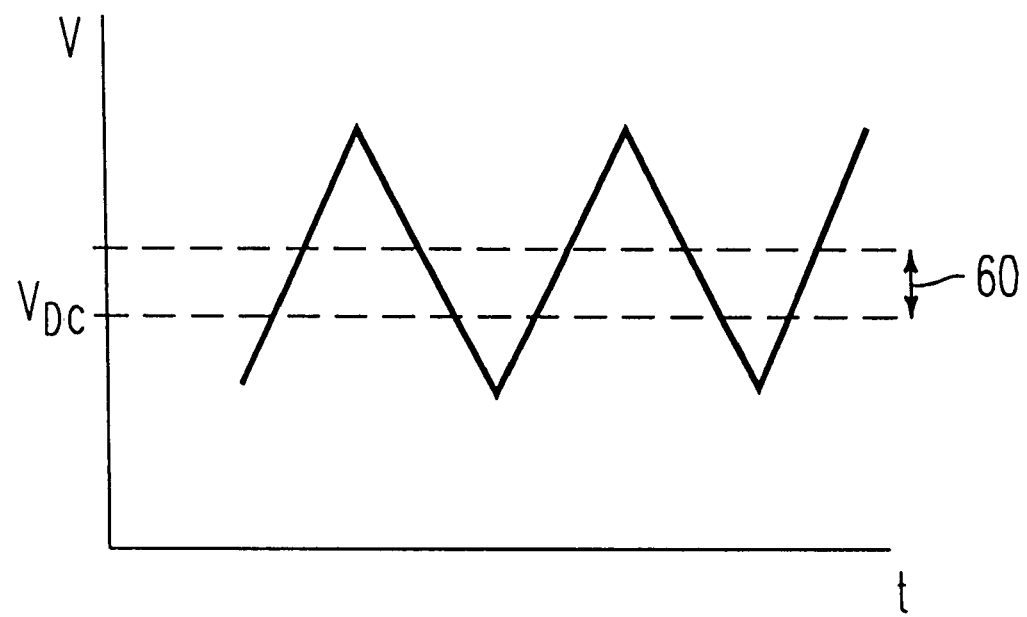

The output of phase detector 23 can be a saw wave. Where, preferably, there is no tracking remaining error, the saw wave, having an operational level $V_{DC}$, has no DC offset, as shown in FIG. 6A. On the other hand, when there is a tracking remaining error, the output of phase detector 23 has a DC offset 60. In a DVD system, for example, the DC offset is representative of the phase difference between the two signals output by adders 22a and 22b (A+D and B+C). In this DC offset is above a certain value, which is related to the system specifications and can be determined experimentally, even if the laser spot is on the track, drive circuits 25 and 26 drive the pickup unit 13 (correct for an error when unnecessary), or when the laser spot is off the track, drive circuits 25 and 26 do not drive the pickup unit 13 (no correction when correction is necessary).

The present invention detects the DC offset value, representing the tracking remaining error, and compensates or cancels the DC offset voltage. The compensation or cancellation is performed by adjusting the delays of the circuits 21a–21d.

Figure 7:
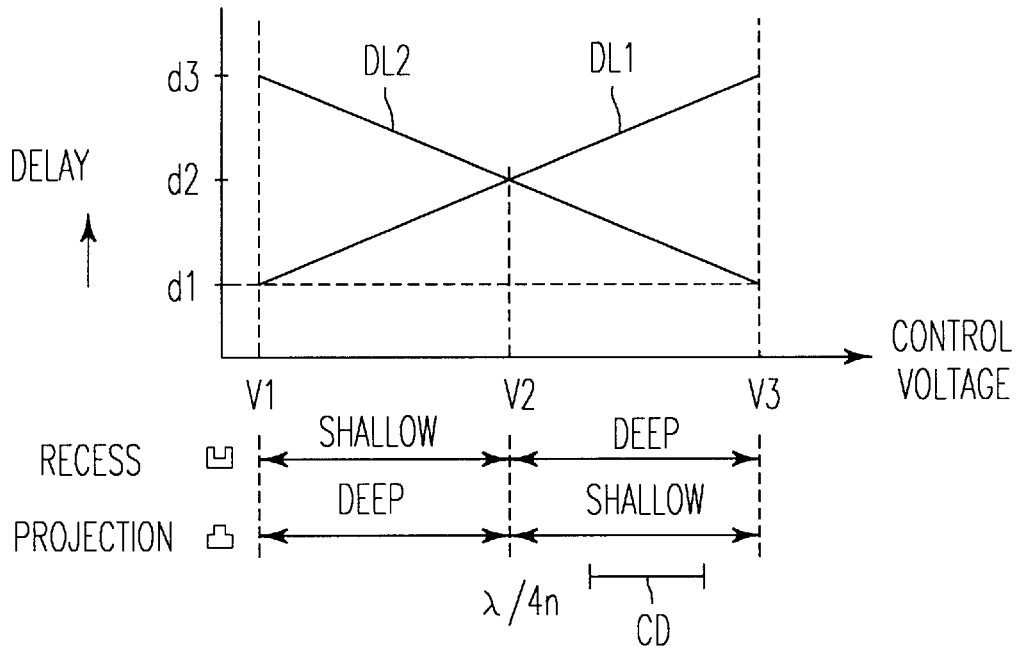
FIG. 7 is a characteristic diagram of a delay circuit according to the first embodiment of the present invention.

FIG. 7 shows the relationships of the delay times set in the first and the second delay circuits of FIG. 5. The delay time of the first delay circuits (DL1) 21a and 21b is set by circuit 33 in a range of d1 through d3 in accordance with the control voltage V1 through V3 and the delay time of the second delay circuits (DL2) 21 c and 21d is set in a range of d3 through d1 in accordance with the control voltage V1 through V3. Therefore, the delay time is increased in accordance with an increase in the control voltage in the first delay circuits 21a and 21b and the delay time is decreased in accordance with an increase in the control voltage in the second delay circuits 21c and 21d. A control voltage V2 at a point where the characteristics of the first and the second delay circuits intersect with each other, that is, the delay times of the first and the second delay circuits are equal to each other, corresponds to the case where the tracking remaining error of a disk having a pit depth of λ/4n is corrected when the wave length of the laser beam is λ and substantially no delay is caused.

At the control voltage V1, the output signals from the photodiodes C and D are delayed from the output signals of the photodiodes A and B by the delay amount (d3–d1) and at the control voltage V3, the output signals of the photodiodes 13a and 13b are delayed from the output signals of the photodiodes 13c and 13d by the delay amount of (d3–d1). Thus, according to the first embodiment of the present invention, the output signals from the photodiodes 13a and 13b can be advanced or retarded with respect of the output signals from the photodiodes 13c and 13d within a range of the delay of from 0 to |d3–d1|.

Figure 1:
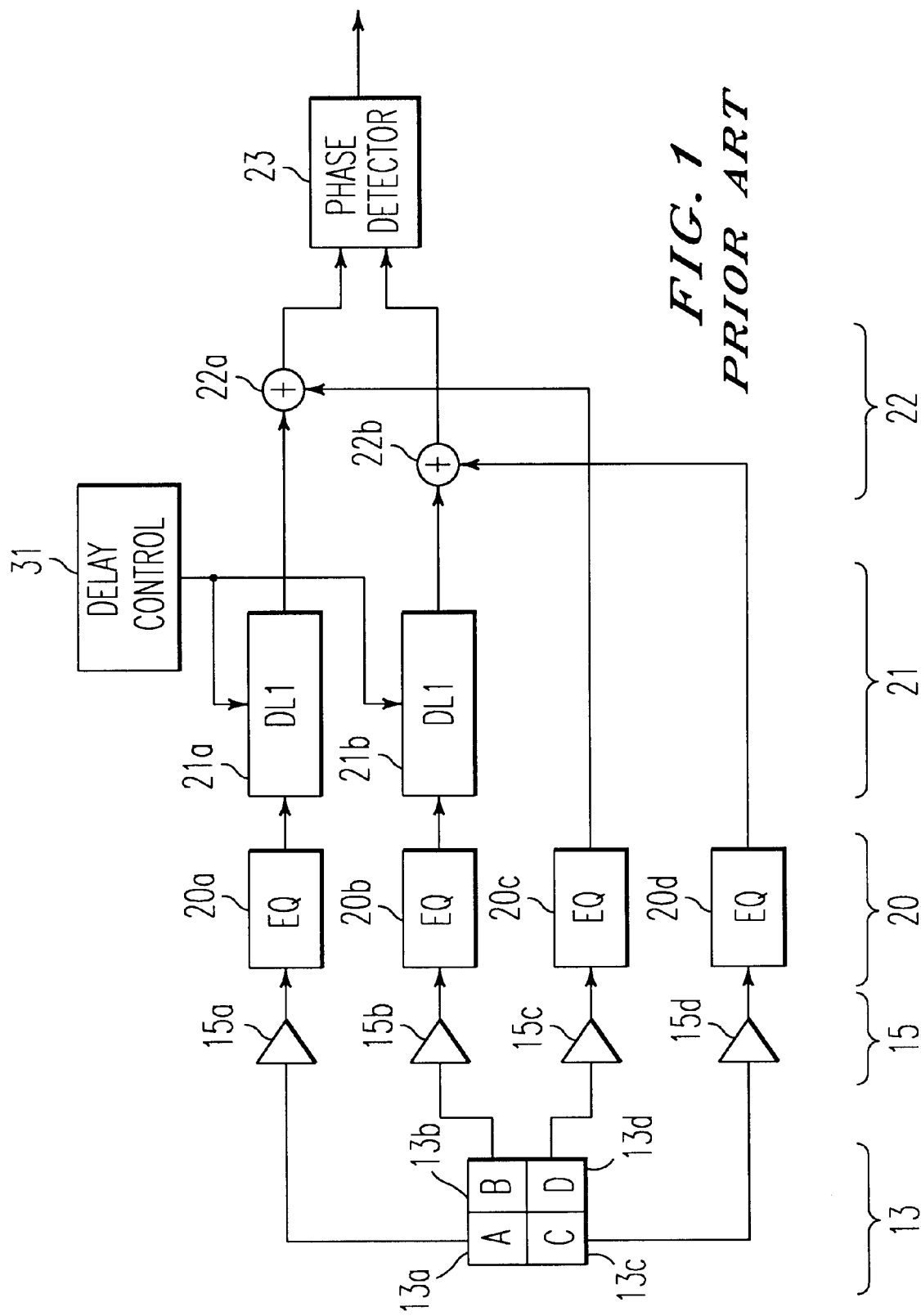
FIG. 1 is a block diagram showing a portion of a tracking control circuit according to a conventional technology.
Figure 2:
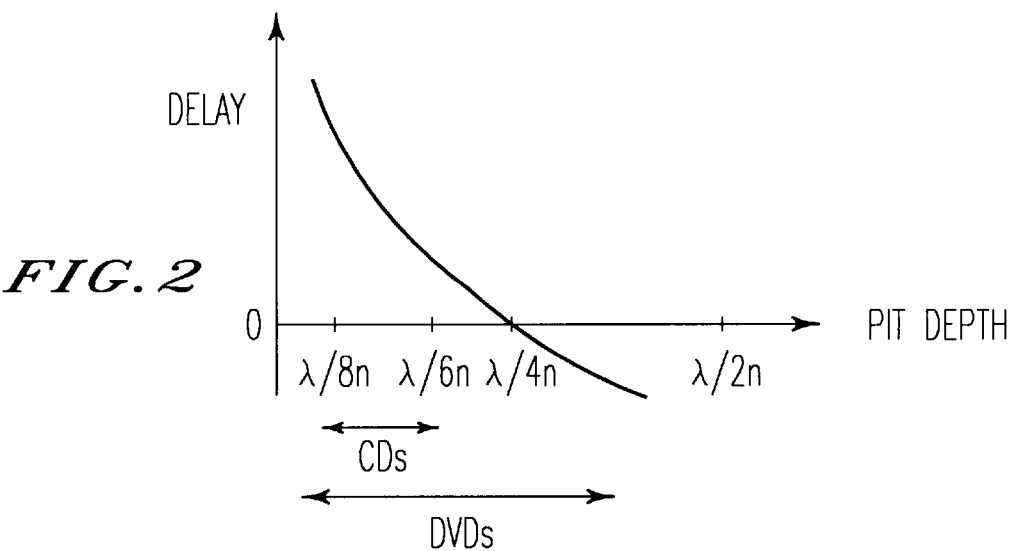
FIG. 2 is a characteristic diagram showing a relation between pit depth of an optical disk and the generated off-set voltage.
Figure 3A:
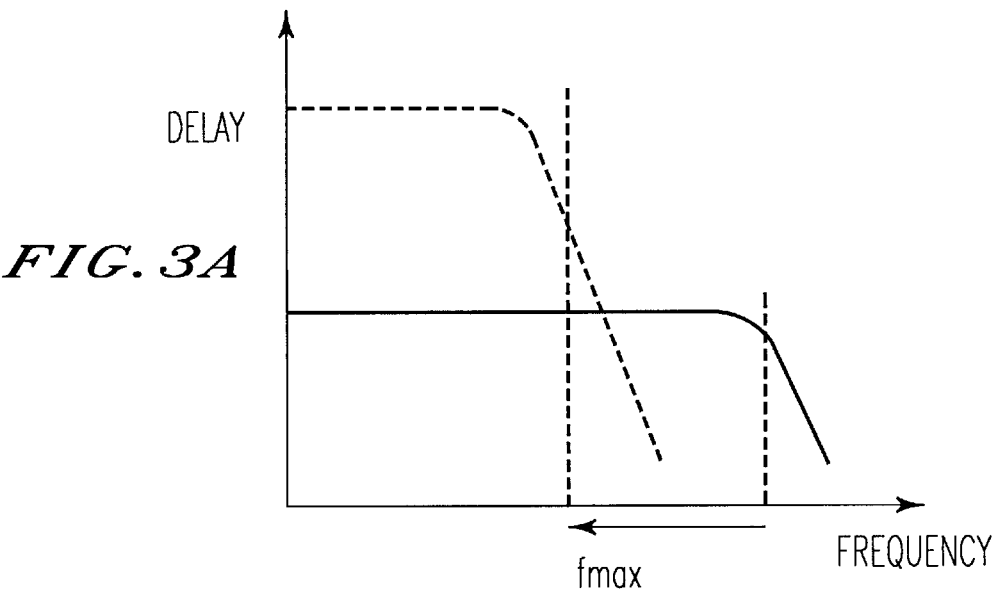
FIGS. 3A and 3B are characteristic diagrams showing the frequency characteristic and the gain of a delay circuit.
Figure 3B:
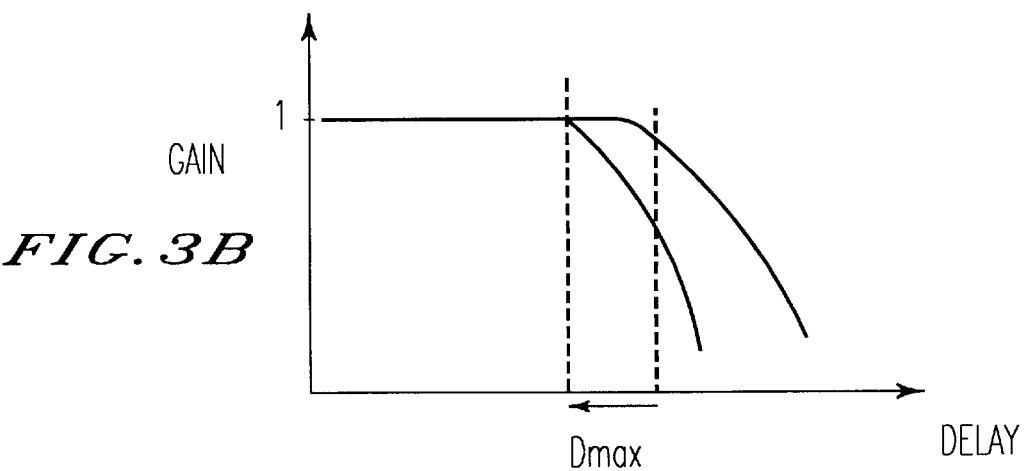

According to the conventional circuit referred to in FIG. 1, only the delay circuits 21a and 21b (first delay circuit shown in FIG. 5) are provided and the delay time is adjusted using one relationship. In contrast, according to the circuit in the first embodiment of the present invention, the second delay circuits adjusts the delays to the output signals from the equalizers 20c and 20d. Furthermore, the delay time is adjusted in the first delay circuits in a manner reverse to the manner of adjusting the delay time of the second delay circuits.

Also according to the first embodiment, the first and the second delay circuits 21a through 21d are provided, where the manner of increasing and decreasing the delay times are reversely related. Therefore, the tracking error can be corrected even in ranges deeper and shallower than the pit depth center of λ/4n. Furthermore, the tracking error can be corrected in either case where the pit is projected and the case where the pit is recessed. The tracking remaining error can be corrected over a wide range irrespective of the kind of the optical disk.

Next, an explanation will be given of a control algorithm according to the present invention with reference to FIG. 8.

First, tracking control is set to OFF (ST1), since it is difficult to identify the tracking remaining error with tracking control on. In the circuit of FIG. 4, the feedback loop for tracking control is disabled. Delays are set in the first and the second delay circuits 21a through 21d (ST2). At this stage the set delays may be arbitrarily determined. The object lens of the pickup 13 is then moved a predetermined distance in the radial direction of the optical disk 11, for example, toward the outer edge (ST3). From a maximum value and a minimum value of the error amount of the tracking remaining error provided by the movement, i.e. maximum and minimum values of the offset voltage, a median value (median value 1) of these is calculated (ST4). Next, the object lens is moved a predetermined distance in a radial direction of the optical disk 11, for example, toward the center (ST5). From a maximum value and a minimum value of the tracking remaining error provided by the movement, a median value (median value 2) of these is calculated (ST6). A difference between the median value 1 and the median value 2 is calculated (ST7). In view of the calculation result, whether the calculated difference falls in a fixed range is determined (ST8). When the calculated difference is out of the fixed range, the delay amount is reset in accordance with the absolute value and the sign of the calculated difference (ST9) and the operation of steps ST3 through ST8 is repeated. When the calculated difference falls in the fixed range, in step ST8, the operation is finished. Fine tracking control can then be carried out by turning ON the tracking control in accordance with the delays set by the above-described operation.

This control algorithm is different from the control algorithm of the conventional device in step ST9 in that the delay is set in accordance with the absolute value and the sign of the calculated difference. That is, according to the conventional method, the delay is calculated based on only one relationship irrespective of the sign of the difference, and the delay can be set by using only the absolute value. However, as explained above, according to DVDs, it is necessary that the delay is set to correct over a range shallower and deeper from λ/4n as the center. Therefore, in step ST9 of the present invention, whether the delay is retarded or the delay is advanced with λ/4n as the center is determined from the sign and the absolute value of the tracking remaining error.

Furthermore, in ST8, the calculated difference is determined whether the value is in the fixed range. The fixed range is determined based upon the tolerance of the device to carry out tracking control in the presence of the tracking remaining error. If the optical device requires highly accurate tracking control, the fixed range should be set narrow. On the other hand, if there is no need for highly accurate control, the fixed range maybe set comparatively wider. This value may be set by control unit 30.

It is also possible to determine the DC offset voltage, and thus the tracking remaining error using only one movement, since the output of phase detector 23 without any offset is known. In this case steps ST5 and ST6 are skipped and the difference is determined from the known value where there is no offset. The known value could also be a previously determined median value or fixed median value. However, it is preferable to use the method of FIG. 8 since the value of the DC offset determined from movement in one direction can differ from that determined from movement in the other direction. Reducing the difference between offset values determined from the two movements. This is due to the fact that the absolute value of the DC offset is approximately one-half of the absolute value of the difference between the two median values. Thus, reducing the difference reduces the offset value.

Next, an explanation will be given of a second embodiment of the present invention in reference to FIG. 9. FIG. 9 corresponds to a portion of FIG. 4, and for the details of the same elements which are not particularly described, reference is made to the descriptions of FIG. 4.

According to the second embodiment, a switch circuit 50 is provided between respective ones of the equalizers 20 and respective elements of delay circuit 41. Delay circuit 41 is constituted by first delay circuits 41a and 41b and second delay circuits 41c and 41d. The delay times of the first and the second delay circuits 41a through 41d are controlled by a delay control unit 42. The switch circuit 50 is constituted by switches 51 through 54. One input terminal 51a of the switch 51 is connected to an output terminal of the equalizer 20a, another input terminal 51b is connected to an output terminal of the equalizer 20c and an output terminal 51c is connected to an input terminal of the first delay circuit 41a. One input terminal 52a of the switch 52 is connected to an output terminal of the equalizer 20b, another input terminal 52b is connected to an output terminal of the equalizer 20d and an output terminal 52c is connected to an input terminal of the first delay circuit 41b. One input terminal 53a of the switch 53 is connected to the output terminal of the equalizer 20c, another input terminal 53b is connected to the output terminal of the equalizer 20a and an output terminal 53c is connected to an input terminal of the second delay circuit 41c. One input terminal 54a of the switch 54 is connected to the output terminal of the equalizer 20d, another input terminal 54b is connected to the output terminal of the equalizer 20b and an output terminal 54c is connected to an input terminal of the second delay circuit 41d. The switches 51 through 54 are controlled by a switch control unit 55.

When the output terminals 51c, 52c, 53c and 54c of the respective switches 51 through 54, are connected to the input terminals 51a, 52a, 53a and 54a as shown by solid lines in FIG. 9, equalizers 20a, 20b, 20c and 20d are respectively connected to the first and the second delay circuits 41a through 41d. Meanwhile, when the output terminals 51c, 52c, 53c and 54c of the respective switches 51 through 54 are connected to the input terminals 51b, 52b, 53b and 54b as illustrated by the broken lines in FIG. 9, equalizers 20a and 20b are respectively connected to the second delay circuits 41c and 41d and the equalizers 20c and 20d are respectively connected to the first delay circuits 41a and 41b.

Figure 10:
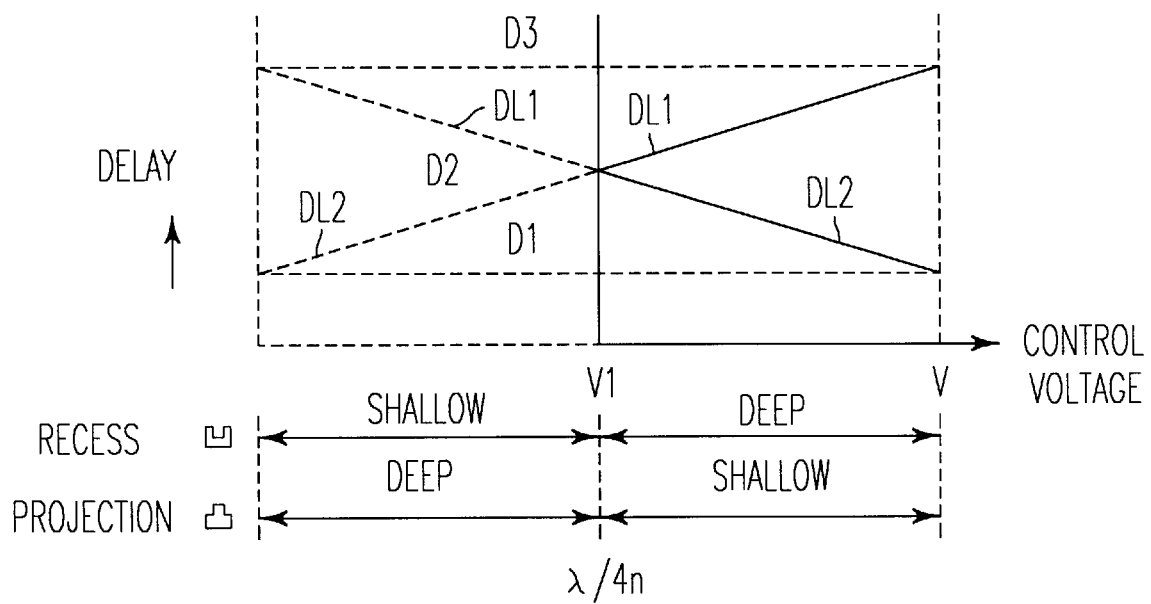
FIG. 10 is a characteristic diagram of a delay circuit according to the second embodiment of the present invention.

FIG. 10 shows the delay times of the first and the second delay circuits. As illustrated by the solid lines in FIG. 10, the delay time of the first delay circuits (DL1) 41a and 41b is set in a range of d2 through d1 and the delay time of the second delay circuits (DL2) 41c and 41d is set in a range of d2 through d3. A point where the characteristics of the first and the second delay circuits intersect with each other, corresponds to the pit depth of λ/4n.

When the switch output terminals 51c, 52c, 53c and 54c are connected to the input terminals 51a, 52a, 53a and 54a as shown by the solid lines in FIG. 9, the delay times are set as illustrated by the solid lines of FIG. 10. Further, when the switch output terminals 51c, 52c, 53c and 54c are connected to the input terminals 51b, 52b, 53b and 54d on the other hand as illustrated by the broken lines of FIG. 9, the delay times are set as illustrated by the broken lines in FIG. 10.

Figure 8:
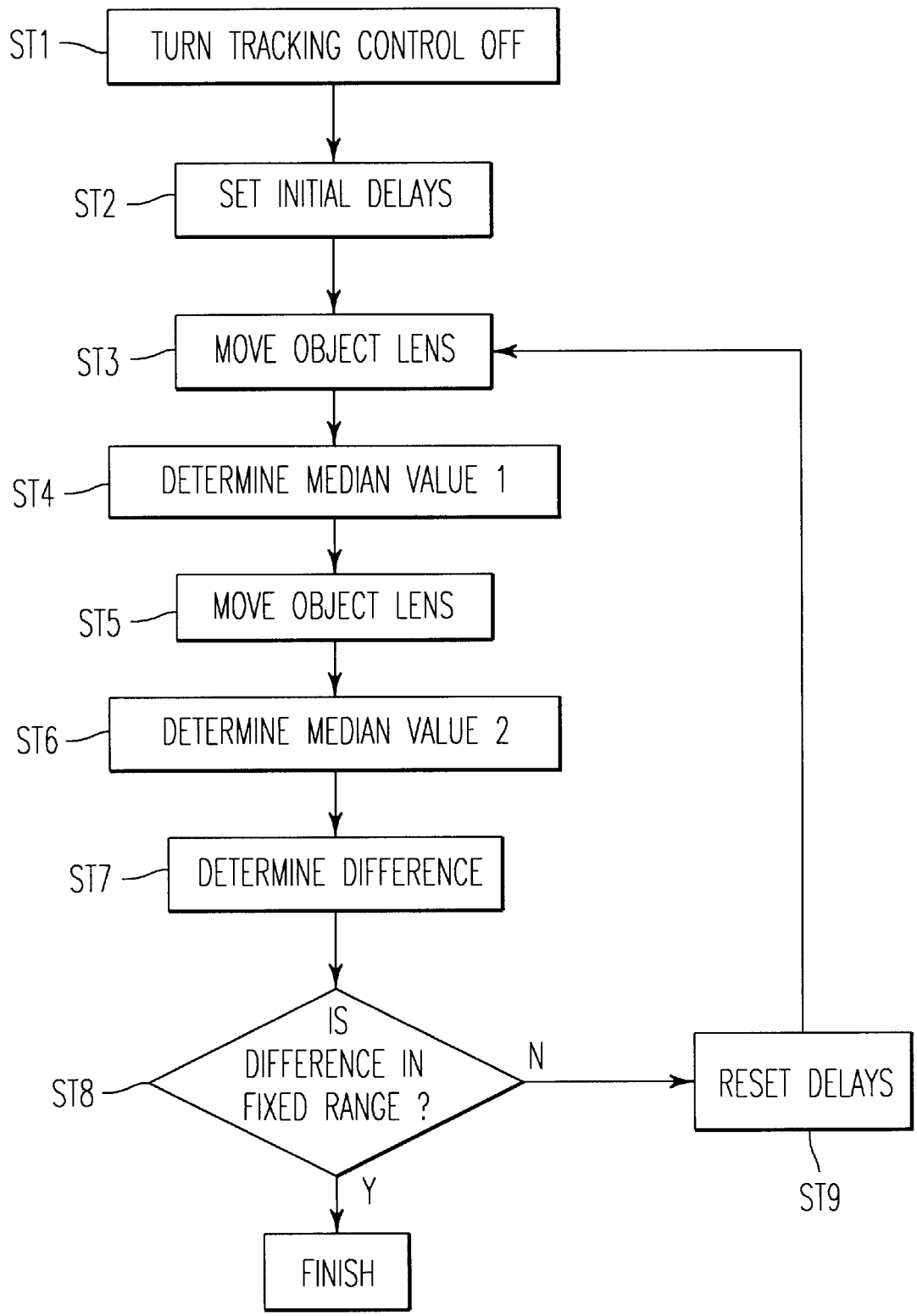
FIG. 8 is a flowchart used to explain a control algorithm of the present invention.

The control algorithm used in the second embodiment is substantially the same as the control algorithm of FIG. 8 which has been referred to as the first embodiment. The second embodiment is different from the first embodiment in that in step ST9, the switch control unit 55 sets the switches 51–54 in accordance with the sign of the calculated difference to reset the delays. Accordingly, the delay control unit simply sets the delays of the delay circuits irrespective of the relationship and can set the delays shown by the broken lines in FIG. 10 by only switching the switch circuit 50 by the switch control unit 55.

According to the second embodiment, the switch circuit 50 is provided between the equalizer 20 and the delay circuit 41, and the connecting relations between the equalizer 20 and the delay circuit 41 can be switched by the switch circuit 50. Therefore, the tracking remaining error can be corrected in accordance with the kind of optical disk by the second embodiment, as in the first embodiment.

Furthermore, according to the second embodiment, ranges of the delay times required for the first and the second delay circuits 41a, 41b, 41c and 41d can be made narrower than those in the first embodiment, by which the frequency characteristics of the first and the second delay circuits can be improved. Therefore, the design of the first and the second delay circuits is simplified compared with that in the first embodiment.

Generally, according to a delay circuit constituted by APFs, when the delay is increased, the cut-off frequency fmax is lowered as explained above. Therefore, when data of DVDs are reproduced, the frequently occurring maximum frequency 3T may be deviated from a predetermined range of delay. However, according to the second embodiment, it is not necessary to significantly widen the range of the delay due to APFs and therefore, the cut-off frequency fmax is not lowered. Therefore, the region of 3T can be set in the predetermined range of delay and the tracking remaining error can be corrected.

Incidently, the first and the second embodiments of the present invention can be operated in accordance with other control algorithms. That is, according to the control algorithm of FIG. 8, in step ST9, the optimum delay time can be calculated in one operation by calculating the absolute value and the sign of the delay time. However, a method of calculating the optimum delay time based on the amount of the tracking remaining error using only the delay without determining the sign, is also possible.

Figure 11:
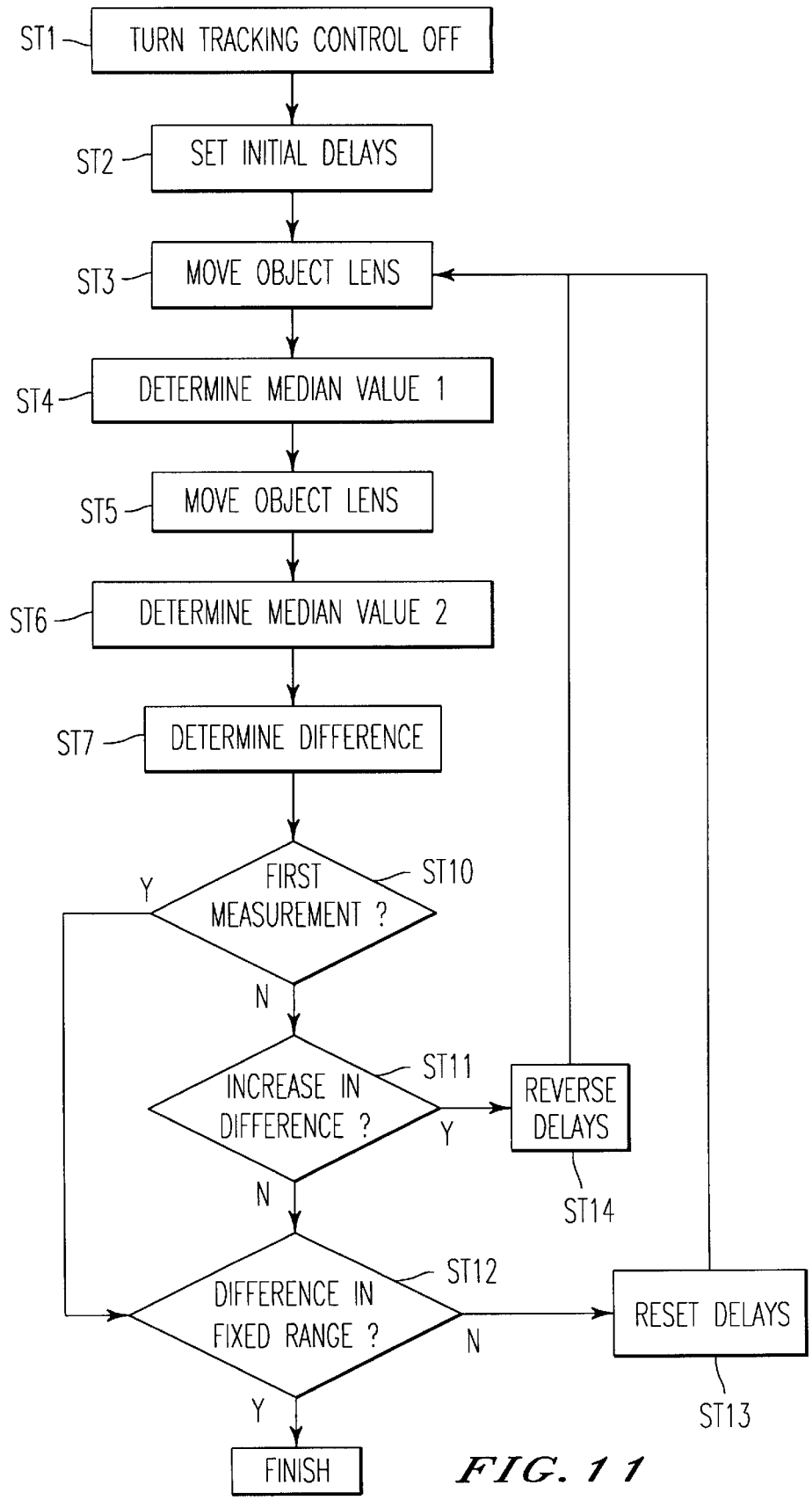
FIG. 11 is a flowchart used to explain another control algorithm of the present invention.
Figure 12A:
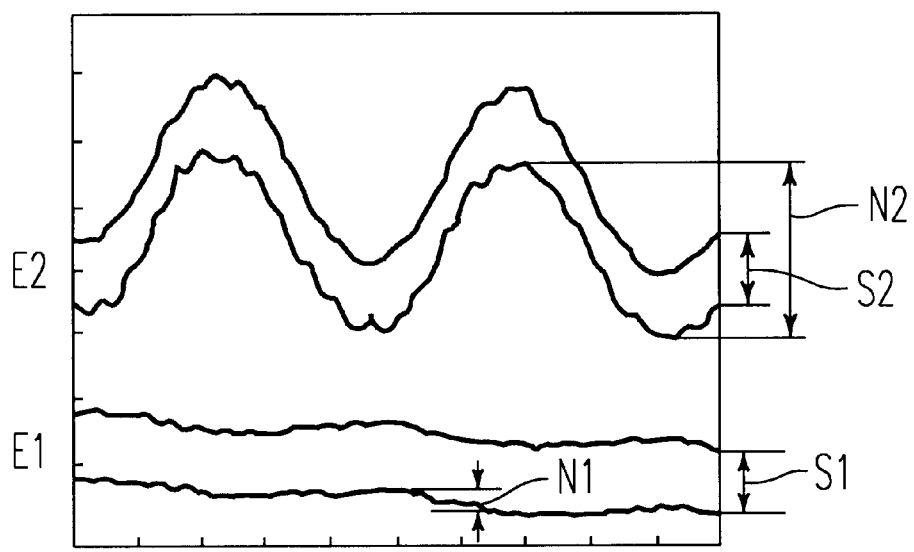
FIGS. 12A and 12B are diagrams used in explaining components of a tracking error signal.
Figure 12B:
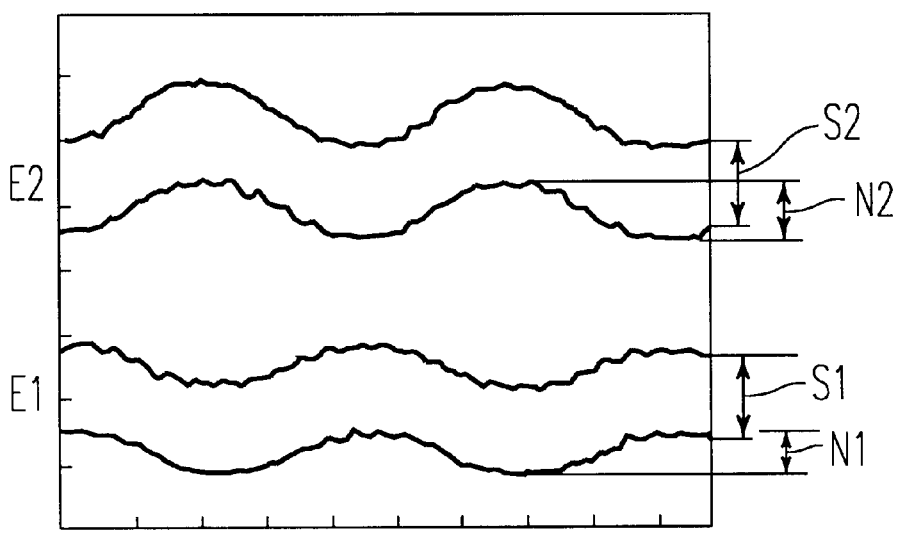

That is, as illustrated in FIG. 11, a difference between a median value 1 and a median value 2 is calculated in step ST7, as in the method of FIG. 8, and then stored, for example, by the system controller. Thereafter, whether the measurement is the first measurement (first time calculated) is determined (ST10). When it is the first measurement, whether the difference is within a fixed range is determined (ST12). When it is not the first measurement, the value of the currently calculated difference is compared with the value of the difference previously calculated and whether the current value of the difference has increased compared with the previous value is determined (ST11). When the value of the difference has not increased from the previous value as a result of the determination, whether the difference is within a fixed range is determined (ST12). When it is not within the range, the delay is reset from the magnitude of the difference (ST13) and thereafter, the steps ST3 through ST7 and ST10 through ST12 are repeated. When the difference is determined to be within the fixed range in step ST12, the operation is finished.

Further, when the difference is increased from the previous value in step ST11, the delays set in the first and the second delay circuits are reversed (ST14) by, for example, activating the switch circuit, and thereafter, the steps of ST3 through ST7 and ST10 through ST12 are repeated and when the difference is determined to be within the fixed range in step ST12, the operation is finished. Thereafter, the tracking control is executed by using the delay times set as described above.

This control algorithm is easier to apply to the second embodiment, where the reverse setting of the delays can be carried out only by switching the switch 50, compared to the first embodiment. That is, when the control algorithm is applied to the second embodiment, firstly, the tracking remaining error is detected by setting an arbitrary delay time and when the tracking remaining error is increased by the set delay time thereafter, the delays can be reversed only by switching the switch circuit 50.

The operations in the control algorithms shown in FIGS. 8 and 11 are carried out by the system controller using information from the various circuits, such as the tracking error detector 24, to set the delays in delay circuits 21a–21d and 41a–41d.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An optical information reproducing device, comprising:

detecting means for detecting light reflected from a surface of an optical disk and outputting a plurality of electric signals based on said detected reflected light;

first delay circuits connected to said detecting means capable of delaying a first portion of said plurality of electric signals by a first delay;

second delay circuits connected to said detecting means capable of delaying a second portion of said plurality of electric signals by a second delay;

adding circuits connected respectively to said first and second delay circuits for adding output signals from said first and second delay circuits and forming first and second added signals;

phase detecting means connected to said adding circuits for detecting a phase difference between said first and second added signals; and a delay control unit for setting said delays of said first and second delay circuits based on an output signal from said phase detecting means;

wherein said first and second delays are reversely related such that when one of said first and second delays increases, the other decreases.

2. A device according to claim 1, wherein:

said delay control circuit sets said delays such that said phase difference between said first and second added signals falls in a predetermined range.

3. A device according to claim 1, further comprising:

switching means provided between said detecting means and said first and second delay circuits for mutually switching connections between said detecting means and said first and second delay circuits.

4. A device according to claim 1, wherein:

said first and second delays each have values in a predetermined range;

a wavelength of said light is λ; and said first and second delay amounts have a common value corresponding to a depth of a pit on said disk of approximately λ/4n.

5. A device according to claim 1, wherein:

said detecting means comprises four photodiodes arranged in a matrix; and said first and second delay circuits retard said electric signals each corresponding to two diagonally arranged photodiodes by respective delays.

6. An optical information reproducing device, comprising:

an optical detector;

a first delay circuit connected to said detector having a first delay;

a second delay circuit connect to said detector having a second delay different from said first delay, wherein said first and second delays are reversely related such that when one of said first and second delays increases, the other decreases; and a delay controller connected to said first and second delay circuits.

7. A device according to claim 6, comprising:

an adder connected to said first and second delay circuits;

a phase detector connected to said adder; and a tracking error detector connected to said phase detector and said delay controller.

8. A device according to claim 6, comprising:

a switching circuit connected between said detector and said first and second delay circuits.

9. A device according to claim 6, wherein:

said detector comprises a photodetector having a plurality of photoelectric elements;

said first delay circuit comprises two first delay elements respectively connected to two of said plurality of photoelectric elements;

said second delay circuit comprises two second delay elements respectively connected to two different ones of said plurality of photoelectric elements;

said device further comprising:

a first adder connected to one of said first delay elements and one of said second delay elements;

a second adder connected to the other of said two first delay elements and the other of said two second delay elements; and a phase detector connected to said first and second adders.

10. A device according to claim 9, comprising:

a tracking error signal generator connected to said phase detector and said delay controller.

11. A device according to claim 9, comprising:

a switch connected between said plurality of detectors and said first and second delay circuits.

12. A device according to claim 11, wherein said switch comprises:

a plurality of switch elements respectively connected between said photoelectric elements and said delay elements.

13. An optical information reproducing device, comprising:

an optical detector;

first means for first delaying first signals from said optical detector by a first delay;

second means for delaying second signals from said optical detector by a second delay;

means for detecting a signal corresponding to a tracking remaining error based upon signals from said first and second means; and means for adjusting said first and second delays using said signal corresponding to said tracking remaining error such that said first and second delays are reversely related where when one of said first and second delays increases, the other decreases.

14. A device according to claim 13, wherein:
said means for adjusting adjusts said first delay using a first relationship of delay to a control parameter;
said means for adjusting adjusts said second delay using a second relationship of said delay to said control parameter reversely related to said first relationship.

15. A device according to claim 14, wherein:
said first and second relationships have a coinciding point corresponding to $\lambda/4n$, where $\lambda$ is a wavelength of light detected by said optical detector and n is a refractive index of a disc.

16. A method of controlling an optical information reproducing device having delay circuits, comprising:
determining a first value of a tracking remaining error;
determining a second value of said tracking remaining error;
determining a difference between said first and second values; and
determining delays for said delay circuits using said difference such that a first delay for a first one of said delay circuits is reversely related to a second delay for a second one of said delay circuits where when one of said first and second delays increases, the other decreases.

17. A method according to claim 16, where determining said delays comprises:
determining a sign of said difference;
determining a magnitude of said difference; and
determining said delays using said sign and said magnitude.

18. A method according to claim 16, comprising:
determining whether said difference is in a predetermined range;
adjusting said delays based upon said difference when said difference is outside of said predetermined range; and
repeating said steps of determining said first and second values, determining said difference, determining whether said difference is in said range and adjusting said delays until said difference is in said range.

19. A method according to claim 16, wherein:
determining said first value comprises determining a first median value of said tracking remaining error;
determining said second value comprises determining a second median value of said tracking remaining error;
determining said difference comprises determining a difference between said first and second median values.

20. A method as recited in claim 19, wherein:
determining said first median value comprises determining a minimum and maximum of said tracking remaining error when a an optical detector in said device is moved in a first radial direction; and
determining said second median value comprises determining a minimum and maximum of said tracking remaining error when an optical detector in said device is moved in a second radial direction.

21. A method according to claim 16, wherein:
determining said first value comprises calculating a first error amount by irradiating a laser beam on a surface of an optical disk and moving, in a radial direction of said optical disk, an optical detector for detecting light reflected from said optical disk; and one of:
determining said second value comprises calculating a second error amount of said tracking remaining error by moving by said optical detector in another radial direction of said optical disk; and
using a predetermined value for said second value.

22. A method as recited in claim 21, comprising:
turning said tracking control off before determining said first and second values.

23. A method according to claim 16, wherein determining said delay comprises:
comparing said difference to a previously determined difference; and
when said difference is greater, reversing said delays in said delay circuits and repeating said steps of determining said first and second values, determining said difference, and comparing said difference.

24. A method according to claim 23, comprising reversing said delays, repeating said steps of determining said first and second values, determining said difference, and comparing said difference until said difference is not greater than previously determined difference.

25. A method according to claim 24, comprising, when said difference is not greater than said previously determined difference;
determining whether said difference is in a predetermined range; and
when said difference is outside of said range, adjusting said delays in said delay circuits and repeating said steps of determining said first and second values, determining said difference, and comparing said difference until said difference is not greater than previously determined difference until said difference is not greater than said previously determined difference.

26. A method according to claim 25, comprising, until said difference is in said range, adjusting said delays in said delay circuits and repeating said steps of determining said first and second values, determining said difference, and comparing said difference until said difference is not greater than previously determined difference until said difference is not greater than said previously determined difference.

27. A method according to claim 16, comprising:
determining whether said difference is in a predetermined range;
setting said range based upon a desired degree of tracking control.

28. A method of operation an optical information reproducing device having delay circuits, comprising:
setting a first delay in selected ones of said delay circuits having a first relationship between delay and a control parameter; and
setting a second delay in selected other ones of said delay circuits having a second relationship between delay and said control parameter reversely related to said first relationship.

29. A method according to claim 28, wherein said first and second relationships having a coinciding point corresponding to a pit depth of $\lambda/4n$, where $\lambda$ is a wavelength of light used in said device and n is a refractive index of a disk used in said device.

30. A method as recited in claim 28, comprising setting said first and second delays to minimize a tracking remaining error in said device.

31. A method as recited in claim 28, comprising setting said first and second delays depending upon a type of disk used in said device.

32. A method of operating an optical information reproducing device, comprising:

irradiating a laser beam on a surface of an optical disk and moving an optical detector having a plurality of photoelectric elements arranged in a matrix and outputting respective output signals;

adding a first delay to output signals from first and second ones of said photoelectric elements;

adding a second delay to output signals of third and fourth ones of said photoelectric elements respectively diagonally disposed to said second and first photoelectric elements;

wherein said first delay and said second delay are reversely related such that when one of said first delay and said second delay increases, the other decreases and said first and second delays are provided with a value where said first and second delays are equal.

33. A method according to claim 32, comprising:

adding delayed output signals from said first and said fourth photoelectric elements diodes to form a first added signal;

adding delayed output signals from said second and said third photoelectric elements to form a second added signal;

detecting a phase difference between said first and second added signals and determining whether said phase difference falls in a predetermined range;

changing said first and second delays in accordance with said phase difference.

34. A method according to claim 33, comprising, after said changing step:

repeating said adding, detecting and changing steps when said phase difference is outside of said predetermined range.

35. A method according to claim 34, comprising:

repeating said adding, detecting and changing steps until said phase difference is in said predetermined range.

36. A method according to claim 34, comprising:

turning tracking control off before said step of irradiating said laser beam; and turning tracking control on when said phase difference is in said predetermined range.

37. A method according to claim 33, wherein said changing step comprises:

switching said first delay added to said to said output signals from first and second ones of said photoelectric elements to said second delay; and switching said second delay added to output signals of third and fourth ones of said photoelectric top said first delay.

38. A method according to claim 32, wherein said value corresponds to a pit depth of $\lambda/4n$, where $\lambda$ is a wavelength of said laser beam and $n$ is a refractive index of said disk.

* * * * *